United States Patent
St. Jacques, Jr.

(10) Patent No.: US 8,533,623 B2
(45) Date of Patent: Sep. 10, 2013

(54) INTERFACE THAT ALLOWS A USER TO RIFFLE THROUGH PAGES OF AN ELECTRONIC DOCUMENT

(75) Inventor: Robert J. St. Jacques, Jr., Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 56 days.

(21) Appl. No.: 12/948,047

(22) Filed: Nov. 17, 2010

(65) Prior Publication Data

US 2012/0124505 A1     May 17, 2012

(51) Int. Cl.
*G06F 3/0483*     (2013.01)

(52) U.S. Cl.
USPC .......................................... 715/776; 345/901

(58) Field of Classification Search
USPC .......................................... 715/776; 345/901
See application file for complete search history.

(56) References Cited

U.S. PATENT DOCUMENTS

| | | | |
|---|---|---|---|
| 7,386,804 B2 * | 6/2008 | Ho et al. | 715/776 |
| 7,748,634 B1 | 7/2010 | Zehr et al. | |
| 2006/0277471 A1 * | 12/2006 | Keely et al. | 715/721 |
| 2007/0048717 A1 * | 3/2007 | Hsieh | 434/317 |
| 2009/0228820 A1 * | 9/2009 | Kim et al. | 715/769 |

\* cited by examiner

*Primary Examiner* — Doug Hutton, Jr.
*Assistant Examiner* — Ashley Fortino
(74) *Attorney, Agent, or Firm* — Fay Sharpe LLP

(57) ABSTRACT

Methods and a system for an electronic device to allow for riffling through pages of a document. A fore edge view of page edges is displayed in a user display of the device and enables pages to be turned to while skipping other pages via inputs received at the user display. The user display has a touch screen interface that senses touch on display. Motion is also detected and when the device is tilted or moved a motion sensed causes the fore edge view to be displayed. Inputs sensed by the touch screen interface cause the fore edge view to be displayed and also allow pages or section of the document to be held concurrently while pages are riffled to in the document. The held pages are easily returned to at will.

20 Claims, 5 Drawing Sheets

INTERFACE THAT ALLOWS A USER TO RIFFLE THROUGH PAGES OF AN ELECTRONIC DOCUMENT

BACKGROUND

The exemplary embodiment relates to fields of image processing. It finds particular application in connection with the provision of a user interface for implementing riffling in an electronic reading device, and is described with particular reference thereto. However, a more general application can be appreciated with regards to image classification, image content analysis, image archiving, image database management and searching, and so forth.

As electronic reading devices or e-readers become popular, much of the "feel" of a book is still desired. There are many different advantages a person may have to owning a paper or a hard back copy of a book. For example, a feeling of ownership, tangible feel, security of presence are just a few of the reasons why books in physical form have yet to ring in their death knell, and thus, make way for a pure electronic book age. Physical books are all around us, such as in stores, libraries and in our homes. Although, electronic books housed in electronic reading devices are quickly populating our surroundings. The benefits of such a trend are many and range from saving trees and chemicals necessary to print, glue and bind documents to benefits of easy transport, greater accessibility and an increase in manipulation capability.

As electronic devices fill our pockets and more storage devices fill their memories, we accessorize and make readily available all aspects of our world, including books, journals, magazines, articles, and documents including text and graphic images to name just a few. One of the barriers to adoption of e-readers is that they do not adequately provide as pleasurable and familiar a feel as an actual book. Therefore, a need is present to provide an intuitive sense of a real book and how it works to an owner of an electronic novel or document having multiple pages.

BRIEF DESCRIPTION

Methods and apparatus of the present disclosure provide exemplary embodiments for a user interface that allows riffling through pages of an electronic document. Sensors of an electronic device, for example, are used to detect when a user wishes to flip through pages of the document. A content display of the device provides the textual and/or graphic images to the reader for viewing in a user display panel. The content display is modified upon the user's request in order to display a fore edge view having pages or page representations in digital format to reader. The fore edge view provides control receptors for manipulating the document's pages. For example, a touch screen interface is provided to turn the pages at the fore edge view to another page. Traditionally, a bounded document having pages is turned to the right as it is read, and thus, the fore edge of the bounded document lies at the right, opposite the document's spine and is where the pages are turned from. Alternatively in other embodiments discussed below, the fore edge is generated at any location proximate to the document in the display.

In one embodiment, the fore edge view includes markers or other visual cues indicating significant sections of the document (e.g., chapters in a book, or manuscript copy, articles in a journal, magazine, or newspaper, or the like). The reader is able to use a finger, thumb or other input device to retrieve an input at the visual cue, and consequently, update the content displayed in a content display with textual and/or graphic images corresponding to a page of the document designated by the cue.

In another embodiment, a place holder input is provided at a user interface in order to hold the location of a page within a document illustrated electronically to a user. A fore edge view is enabled by the user and used to flip through multiple pages at once while concurrently holding the previous location. A content view section of the user display is updated to illustrate the page flipped to. Afterwards, a return place holder input is received causing the content view to return back to the content of the page that was held. The inputs are provided by a touch screen interface that are received thereat for holding various locations of a book and allowing the user to riffle through pages of the document as rapidly as desired.

In yet another embodiment, a method for a user interface system to enable riffling through pages in a user display of an electronic device is executed via a processor with a memory storing executable instructions having the method. The method comprises receiving a document having multiple pages and displaying the document in a content view of the user display by the device. Upon receiving one of a plurality of fore edge view requests, a fore edge view of the document is displayed in the user display, in which provides riffling controls for a reader to riffle through the pages from a first page displayed in the content view section to a second page, while skipping over at least one page in between the first page and the second page. A first riffling input is retrieved that causes the document to turn the pages of the document in the content view section of the user display from the first page to the second page and skip a first number of pages in between the first page and the second page. A first place holder input is concurrently retrieved to hold a location of the first page at the content view via a first touch or first motion on the display. A second riffling input is retrieved while holding the location of the first page and holding a location of the second page from a second place holder input retrieved. Pages of the document are turned from the second page to a third page while skipping a second number of pages in between the second page and the third page.

In another embodiment, an electronic device having a user display for displaying an electronic document having pages is disclosed herein. The device comprises a communication port for receiving the electronic document and a motion sensor that senses a motion of the device. The device further comprises a touch screen interface in the user display that senses at least one of a tap, swipe and motion as an input on the user display. The device includes a content view generator that displays the document in the user display and a fore edge generator that displays a fore edge view in response to the input received by the touch screen interface or the motion sensed by the motion sensor. The fore edge view has page edges that correspond to pages of the document and riffling controls thereat. The riffling controls includes a touch screen control interface that operates as a riffling receptor configured to sense a touch or motion thereat and cause pages of the document to skip one or more pages to a different page for display in the user display. In addition, a place holder is configured to hold a location of one or more pages for a user to return to without having any other page displayed there between.

DETAILED DESCRIPTION

Aspects of the exemplary embodiment relate to a device and methods for providing the ability to adequately appreciate the ownership of a document, such as a classical novel, or piece of philosophy in electronic format, as well as intuitively navigate its controls. One barrier to adoption of e-readers, for example, is that they do not adequately provide the same sense as a book or other like document. While the feel of a book may be hard to articulate objectively to those never having had the experience, one of the features that e-readers or electronic reading devices lack is an ability to flip through the pages in a way that is analogous to flipping through the pages of a traditional ink-and-paper book. For instance, readers are often accustomed to rapidly flipping through the pages, often several or more at time. A reader may turn to the place in which she left off by flipping to a place holder or intuitively open the document to return to a known section location concurrently to riffling. In other instances, a reader of a document may riffle through a chapter to estimate the length of time to finish it, or to discover an unlikely twist of knowledge, either in a heading, a graphic or in the text itself.

Further, a reader may also hold the edges of pages in hand and flip through the pages rapidly with a finger or thumb. A reader may do so to randomly sample a section or to search rapidly for information by observing a page and quickly jumping forward past two or more other pages depending upon the reader's familiarity with the text or graphics of the document.

Methods and devices are thus described herein that simulate far closer than before the actual sensation of flipping through paper pages several or more at a time.

Figure 1:
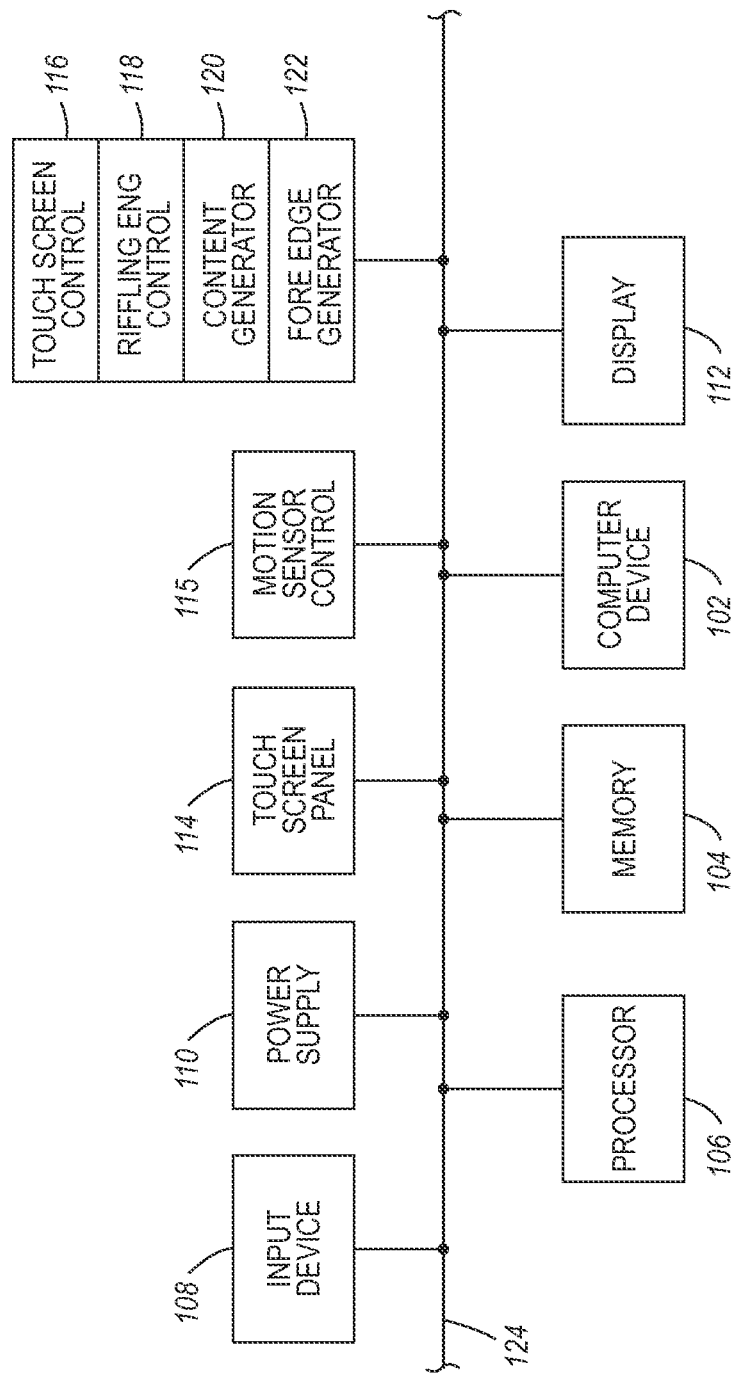
FIG. 1 is a functional block diagram of a user interface system according to embodiments herein.

FIG. 1 illustrates one embodiment of an exemplary user interface and control system 100 for riffling through pages of a document. A client device, such as a computer device 102 comprises a memory 104 for storing instructions that are executed via a processor 106. The system 100 may include an input device 108, a power supply 110, a display 112, a touch screen interface panel 114, and/or a motion sensor control 115. The system 100 also includes a touch screen control 116 having a riffling engine control 118, a content generator 120 and/or a fore edge generator 122. The system 100 and computer device 102 can be configured in a number of other ways and may include other or different elements as can be appreciated by one of ordinary skill in the art. For example, computer device 102 may include one or more output devices, modulators, demodulators, encoders, and/or decoders for processing data.

The device 102 may include an electronic reader device, a mobile device for reading documents in the user display 112, or other like electronic device, such as a wireless laptop, mobile phone, or the like. Documents presented in the display 112 of the device 102 include any digital document having text and/or graphic images therein, such as books, novels, journals, newspapers, articles, online articles or a compilation of web-pages, digitally copied manuscripts or any other like digital medium that presents textual and/or graphic images to a user/reader in the form of multiple pages.

A bus 124 permits communication among the components of the system 100. The processor 106 includes processing logic that may include a microprocessor or application specific integrated circuit (ASIC), a field programmable gate array (FPGA), or the like. The processor 106 may also include a graphical processor (not shown) for processing instructions, programs or data structures for displaying a graphic and a text.

The memory 104 may include a random access memory (RAM) or another type of dynamic storage device that may store information and instructions for execution by the processor 106, a read only memory (ROM) or another type of static storage device that may store static information and instructions for use by processing logic; a flash memory (e.g., an electrically erasable programmable read only memory (EEPROM)) device for storing information and instructions, and/or some other type of magnetic or optical recording medium and its corresponding drive.

The touch screen panel 114 accepts touches from a user that can be converted to signals used by the computer device 102, which may be any processing device, such as a personal computer, a mobile phone, a video game system, or the like. Touch coordinates on the touch panel 114 are communicated to touch screen control 116. Data from touch screen control 116 is passed on to processor 106 for processing to associate the touch coordinates with information displayed on display 112.

Input device 108 may include one or more mechanisms in addition to touch panel 114 that permit a user to input information to the computer device 100, such as microphone, keypad, control buttons, a keyboard, a gesture-based device, an optical character recognition (OCR) based device, a joystick, a virtual keyboard, a speech-to-text engine, a mouse, a pen, voice recognition and/or biometric mechanisms, etc. In one implementation, input device 108 may also be used to activate and/or deactivate the touch screen interface panel 114. The input device 108 may also include a storage or communication port, such as a USB drive, internet connection or the like for downloading readable documents having text and/or graphic imagery therein.

The computer device 102 can further provide a graphical user interface as well as provide a platform for a user to make and receive telephone calls, send and receive electronic mail, text messages, play various media, such as music files, video files, multi-media files, games, and execute various other applications. The computer device 102 performs operations in response to the processing logic of the touch screen control 116.

For example, the riffling engine control 118 executes sequences of instructions contained in a computer-readable medium, such as memory 104, which interpret user input at the touch screen panel 114. For example, a user's hand may touch a document in a content view of the touch screen interface panel 114, and thereby, activate a different view, such as a fore edge view that enables riffling of the document pages by the reader. The content generator 120 recognizes a user input as well for manipulating the document and pages of the document, and executes sequences of instructions to interpret user input at the touch screen panel 114 for retrieving the document and manipulating the document in a variety of ways.

Instructions executed by the engines/generators 118, 120 and/or 122 may be read into memory 104 from another computer-readable medium. In alternative embodiments, hardwired circuitry may be used in place of or in combination with software instructions to implement operations described herein. Thus, implementations described herein are not limited to any specific combination of hardware circuitry and software.

Touch screen control 116 may include hardware and/or software for processing signals that are received at touch screen panel 114. More specifically, touch screen control 116 may use the input signals received from touch screen panel 114 to detect a touch by a dominant or a first hand as well as a movement pattern associated with the touches so as to differentiate between touches. For example, the touch detection, the movement pattern, and the touch location may be used to provide a variety of user inputs for interacting with a document, which is displayed in the display 112 of the device.

In one embodiment, the content generator 120 recognizes user input as a fore edge view request. A request for a fore edge view is provided by the user when the user wants to riffle through pages of the document, and may be in the form of a touch screen swipe, tap, gesture, click and/or a motion of the electronic device 100 or the like that is sensed. For example, the content touch screen 114 processes a touch at the content view in the user display 112 and in response the fore edge generator 122 processes a sequence of instructions for generating the fore edge view. Upon retrieving a request to generate the fore edge view, the interface and control system 100 modifies the content view of the document's content in the display to provide for area to accommodate the fore edge view display. The fore edge view is thereafter displayed adjacent to the content. The fore edge view and content views of the display will be further discussed in detail in relation to other exemplary embodiments of later figures.

For example, the display 112 provides for a content view and a fore edge view regardless of any input received by the reader. The display 112 therefore includes two different display sections that may be operable for a touch screen interface panel 114 at either or both of the different display sections. For example, only the fore edge view may provide for a touch screen interface control that has riffling receptors for generating a riffling action by the riffling engine control 118, while the content view displays the result of these actions and updates the content displayed therein. In this case, the content view of the display may also have a touch screen interface control 116 that is operable for a user to interact with the document therein. The device may then retrieve an input for generating the fore edge view at the fore edge view section of the display 112, rather than at the content view section. Other alternative embodiments are also envisioned and the present example is not meant to limit the touch screen interface for riffling through the pages of a document. For example, riffling may be provided in the same content view in which content of the document is displayed.

Figure 2:
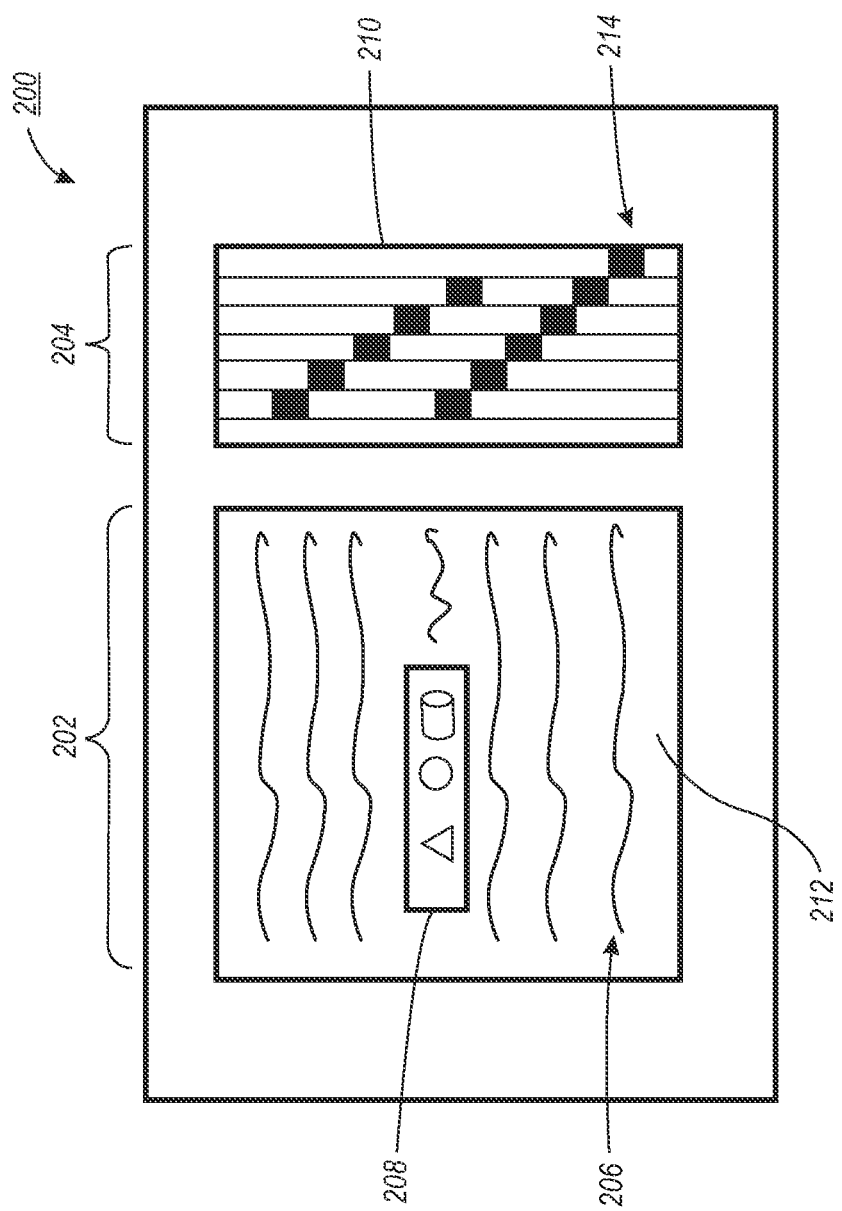
FIG. 2 is one aspect of a user interface according to embodiments herein.

Referring now to FIG. 2, illustrated is an electronic device 200 having multiple displays for displaying an electronic document. The device 200 comprises a processor (106, of FIG. 1) coupled to an image input device (108, of FIG. 1) that comprises any device capable of executing a set of logical instructions and can comprise, for example, a computer, a personal digital assistant (PDA), digital camera, cell phone, printer, copier, or the like. Such devices can include the user interface 100, which may further comprise, but is not limited to, a key board, camera, microphone, pointing device, display, speakers, audio/visual inputs/outputs network connections and/or other devices of the device 108 and/or processor 106. A document may be any digital representation of a body of information having a plurality of pages capable of being communicated to an output device for display, print, and/or alteration (e.g., a compilation of photos, or presentation document having multiple slides).

The electronic device 200 provides electronic documents for use as an electronic reading device. The device 200 has two displays, which are illustrated as permanent displays in this example, but are not necessarily permanent. A first display 202 is considered a content view 202 that provides a textual content 206 and/or a graphical content 208 for display to the user. A second view 204 is considered a fore edge view 204 that provides a view of the pages edges 210 of the document provided in the content view 202 to the reader.

In one embodiment, the fore edge view 204 is displayed in response to certain user-triggered events (e.g., a button press, click, tap, motion, gesture, etc.) or may be displayed permanently in conjunction with the content view 202. The pages 210 correspond to the number of pages of a document 212 displayed in the content view 202. The fore edge view 204 illustrates changes of the views dynamically based upon the document 212 and the number of pages 210 it comprises. This enables the device 200 to imitate a reading experience of a physical book, which changes in the number of pages according to the particular book or other like document. For example, the number of pages 210 of the document 212 illustrated may be seven pages, such as with a children's novel, and thus, seven pages may be illustrated in the fore edge view 204. Alternatively, the fore edge view may be static as well and the document may contain any number of pages that are likewise illustrated in number as page edges in the fore edge view 204.

In one embodiment, the fore edge view 204 generates markers 214 corresponding to sections of the document displayed in the content view 202. The markers 214 may dynamically change in position depending upon the document displayed and sections sensed therein. Each marker 214 enables a reader to open, flip, turn or riffle to a section of the document in the content view located adjacent to or alongside one of its perimeters once the fore edge view 204 has received an input thereat.

For example, while the fore edge view 204 contains a virtual representation of the edge of the pages of a document, similar to the fore edge of a book, opposite the book's spine, markers 214 are presented in the fore edge view 204 that may include, but not limited to: chapter markers, highlight locations, bookmarks, note locations, section headings, sub-section headings, and the like. An input may be received at the marker 214, such as a touch, gesture, tap, motion or the like, in which triggers the device 200 to update the content view 202 with a corresponding section of the document, which may or may not be on a different page than is presently displayed. The markers 214 correspond to different sections of the document, as discussed, and may also correspond to various graphic images 208 also.

Figure 3:
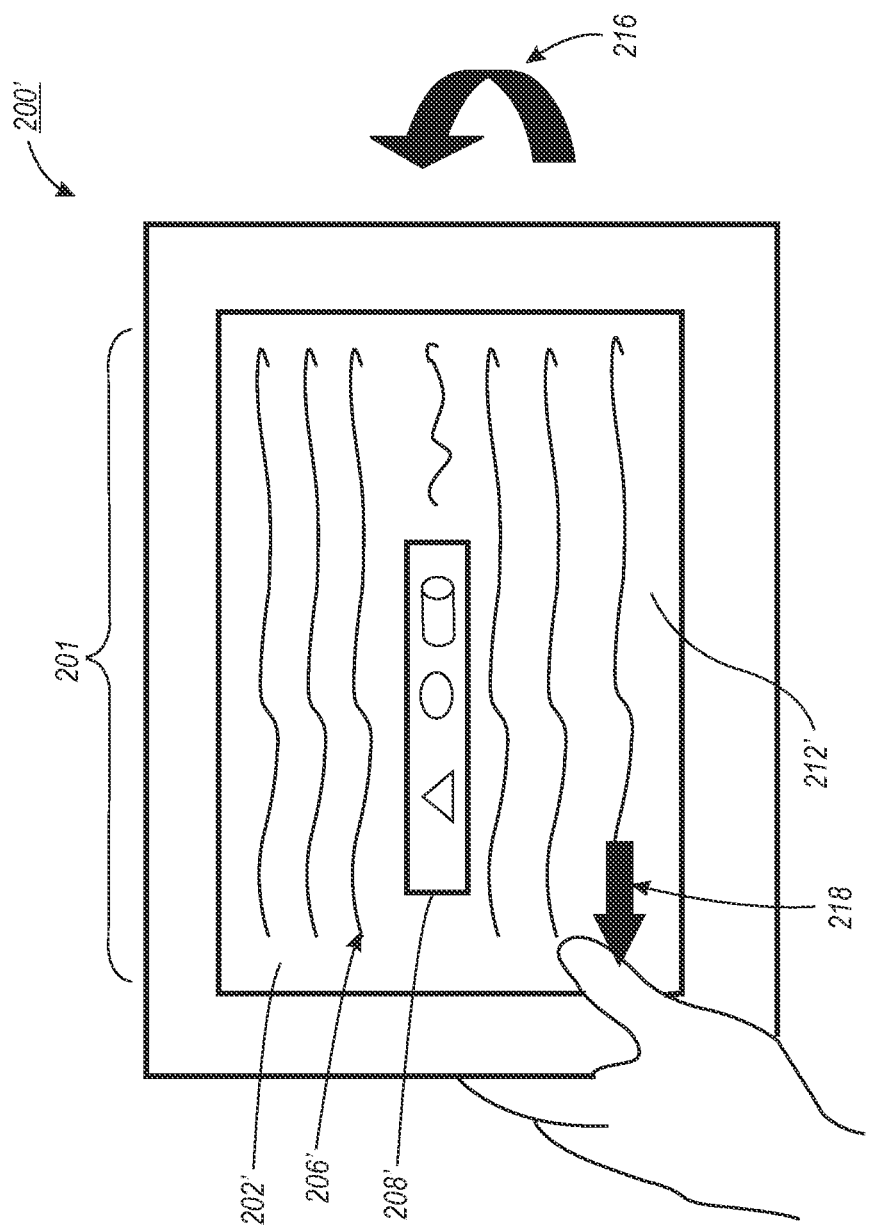
FIG. 3 is another aspect of a user interface according to embodiments herein.
Figure 4:
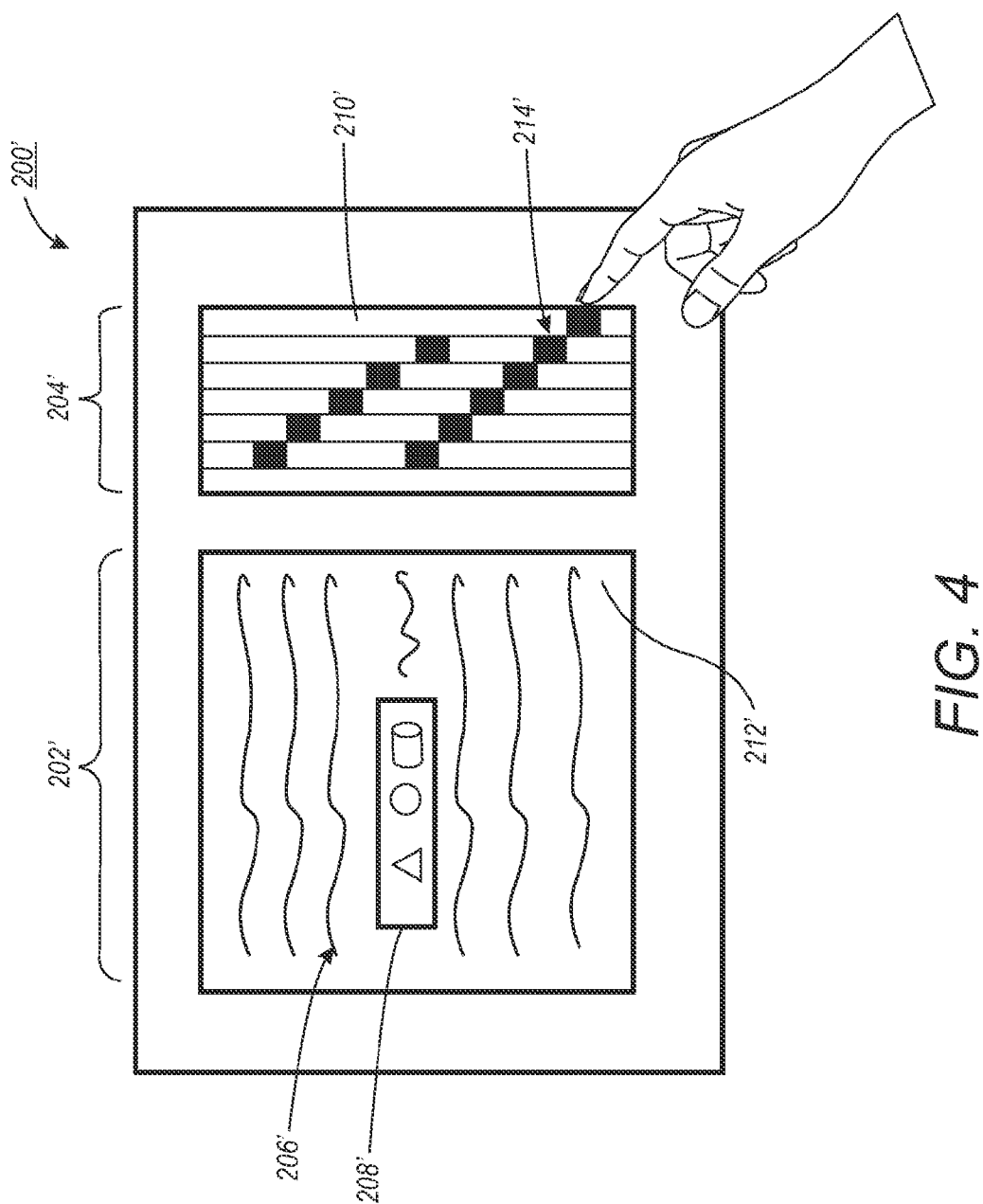
FIG. 4 is another aspect of a user interface according to embodiments herein.

Referring now to FIGS. 3 and 4, illustrated is an electronic reader device 200' as an exemplary aspect of the disclosure. The device 200' comprises a display 201 having a content view 202' and a fore edge view 204' in one panel. The display 201 interacts with a touch screen panel 114 (shown in FIG. 1) and enables touch screen controls to be retrieved and processed.

The display 201 is a single display, for example, that presents an electronic document 212' having text 206' and/or graphic content 208' in content view 202'. The content view 202' is generated by a content generator of the touch screen controls to present each new document (e.g., e-book, journal, magazine, pages, or the like) for reading. The document is displayed in the content view 202' in a section of the display 201. A user of the device interacts with the document via various touch screen controls.

In one embodiment, at least one touch screen control at the display 201 includes different fore edge view inputs 216, 218 that trigger the display of a fore edge view 204'. For example, a swipe input 218 with a user's hand triggers the display of the fore edge view 204' in FIG. 4. The swipe input 218 may alternatively be in the form of a motion swipe, a tap or various touch screen interface controls. The fore edge view 204' may be displayed, for example, as long as a finger or thumb is held on the screen. For example, a thumb may be used to slide across the content view 202' of the display and provide the fore edge view input 216 that triggers display of the for edge view 204'. As long as the thumb remains held to the content view section the fore edge view 204' continues to be displayed.

In another embodiment, a swipe at a location of the display 201 triggers display of the fore edge view and does not need to be held to the screen. For example, once a user's hand, stylus or other mechanism that may be used to perform the gesture or touch for triggering the view 204' is released from the screen the fore edge view may remain in place until another input is received to close or hide the fore edge view 204', such as a hide for edge view input including a touch release, an alternative motion, tap, click, swipe, gesture, or the like.

Upon receiving a request via a swipe, touch or tap for the fore edge view 204', the fore edge view 204' displays page edges 210 corresponding to the pages of the document in the content view. The page edges 210 may vary in number depending upon the number of pages of each document or represent a different number of pages other than a one-to-one correspondence. After the fore edge view is generated, the reader of the document has access to riffling controls affected by riffling receptors in the touch screen control (in FIG. 1) that operates for riffling through pages of the document. Riffling through a document, such as a novel, includes skipping different pages at once. For example, a reader that is relatively familiar with the document may desire to skip to a certain page by just opening the book, or the reader may want to skim through a document's pages just to get a feel of the content. Various other reasons may possess the reader to riffle through the pages of a document. In one example, however, the reader uses a hand 220 or other mechanism of FIG. 4 to swipe the fore edge view 204' in a similar manner as flipping through pages several or more at a time of a physical novel or document in the reader's other hand.

In another embodiment, the display 201 triggers the display of the fore edge view 204' by use of a motion sensor control (115 of FIG. 1) for generating the fore edge view request 216 input, as shown in FIG. 3. For example, a reader may grasp the device 200' and tilt it in direction or other like motion, such as a shake or movement. Upon sensing the motion for the fore edge view request 216, the device 200' generates the fore edge view 204' causing page edges of the document display. The reader then has access to riffling controls that enable the electronic manipulation of pages throughout the document and cause the document to update accordingly within the content view 202'. Similar to a physical book with a spine, a reader is thus provided a tangible feel and similar manipulation style of a reading experience. Just as a reader picks up a book and holds the spine for pages to turn by the wayside, the device 200' operates upon sensing a motion by showing the page edges 210 in a fore edge view 204'. Additional motions can cause the pages to riffle or fall to another side, just as riffling inputs provided to the fore edge view 204' cause the document to riffle through pages. Alternatively, in another embodiment, the reader/user can press and drag a finger across a portion of the screen onto the display.

Motion controls 115 that are coupled to the touch screen control 116, as illustrated in FIG. 1, may be provided by different sensors, such as gyroscopes or accelerometers and the like. These sensors could be used to detect specific motions, such as discussed above, that are performed by the user to trigger the fore edge view 204'. Users may hold the device 200' in various positions (e.g., seated at a table, in the user' laps, while reclined in bed, or other positions). The motion or tilt detected then is sensed in the device based on calibration that may be done periodically, when the device is turned on or at will of the user by any appreciable means.

In one example, the motion sensor controls are synchronized to an originating position and any motion causing variance within a range of tilt causes the fore edge view 204' to appear. The content view 202' is re-sized from the display section 201 of FIG. 3, to a different size as delineated in FIG. 4. For example, an input 216 or 218 may be received that results in the content view being compressed or re-sized to a percentage of its original size. For example, the content view 202' may be compressed 60% or some other percentage amount to make room for the fore edge view 204'. Concurrently, the fore edge view 204' may be displayed in the remaining 40% of the display. The reader is then able to riffle through the pages of the document using the fore edge view 204' in a fashion simulating a physical reading experience.

Riffling includes any action of flipping through pages, and specifically, skipping at least one page between pages or rapidly flipping pages. Riffling also includes holding a place in the document and turning additional pages while the place is being held from a first page to a second different page. Riffling can be performed backwards and forwards among the pages of a document via interaction with riffling controls of the fore edge view 204'. Once the fore edge view 204' is displayed or if it is permanently displayed in the device display screen, the content view is updated in response to user interactions at the fore edge view 204' as discussed above. The interaction for providing riffling inputs can vary. For example, gestures may be used where the user slides a finger or thumb in one direction. Taps may be used at a specific location or marker 214. The device is then updated in the content view 202' accordingly to reflect the content at the corresponding location in the electronic book. The location may be determined based on the depth into the fore edge view 204' in which the user interacts or touches the screen in a touch screen interface, or the location or page number, for example, may correspond to the particular page edge 210' illustrated in the view 204' in which the user touches and/or swipes to riffle to. Alternatively, hardware controls are also envisioned in which the user may navigate the fore edge display. For example, "next" or "previous" buttons may jump from one marker to the next. Rocker switches may smoothly and rapidly navigate or riffle through the pages in the direction that they are pressed. Touch pads may also mimic finger or thumb gestures that are discussed above.

Riffling through the pages of a book or another physical document also provides the experience of being able to place hold or bookmark several locations and flip back and forth from among bookmarked places as well as riffle through pages from a first page to a second page while skipping at least one page in between the first and second page.

In one embodiment, a riffling action or input is provided by the hand 220 swiping from a first page to a second page. The page edges in the fore edge view 204' may or may not correspond directly to a page of the document presented in the content view 204'. If the pages do not correspond, a speed control may be adjusted for controlling the rate in which pages turn in the content view. The action of turning may be displayed in the content view also depending upon the power of a graphics processor therein, or other processing means. Alternatively, pages may be riffled from a first page directly to a second page in which the speed of the riffling is varied in order to catch glimpses of the content of each page, or to imitate a page flowing peacefully to another section in order for a reader to catch his or her breath between a plot spanning across different pages. The pages of the document may also be flipped or turned depending on how fast and how often the reader swipes the fore edge view 204'. Other inputs other than swiping may also provide input for turning pages for a riffling action to occur. For example, tapping a marker in the fore edge view may turn the page to a corresponding section in the document, and as such, tapping the fore edge view on a page at various speeds may also cause pages to turn several at a time.

Riffling includes turning pages one or more at a time while place holding a section of interest. A bookmark or place holder may be implemented for various purposes, for example, to discover a plot at the end of a chapter to kill suspense or for turning backwards in order to recall a definition, plot detail, or any other piece of information in text or graphic form within the document presented. Therefore, a page displayed in the content view 202' of device 200' can be tapped, marked, clicked, touched at a location or be inputted at the fore edge view 204' in order to hold a first place while additional pages are riffled from a first page to a second page. A page is held concurrently to riffling actions by a first place holder input into the device and a riffling action is then stimulated electronically via the fore edge view 204' interface riffling controls. Additional place holders may also be inputted for each page the reader desires to mark or hold, while riffling occurs concurrently in the content view.

In another embodiment, gestures or input at different locations of the screen may display the fore edge view 204', such as at the right side of the screen if a reader is accustomed to holding a book by its spine and turning pages from right to left. Other orientations are also envisioned, such as a left-handed reader may prefer to have the fore edge view 204' appear on the left side of the content view 202'. In alternative embodiment, the fore edge view 204 may be displayed at the bottom or top of the content view 202' and the pages be flipped from top to bottom, or from bottom to top depending on the reader's preference. Alternatively, once the fore edge view 204' has been triggered to appear on one side adjacent the content view 202', the reader may tilt or rotate the device so that the fore edge view 204' moves to another adjacent side of the content view 202'. For example, rather than the right side of the content view 202', as illustrated in FIG. 4, the fore edge view 204' can be made to rotate to another different side, such as the left, top or bottom sides of the content view by a rotation of the device and/or a tilt Once the reader moves the fore edge view 204' to a desirable position for an optimal reading experience, an additional tilt, jolt, shake, touch, tap, or the like may be provided by the reader as input to lock it in position.

The location of the fore edge view 204' may also be dependent upon the direction of motion on the touch screen panel. For example, a gesture in the direction of right to left in the content view 202' may cause the document text and/graphics displayed to move over or compress the right side portion to provide the appearance of the fore edge view to the right side adjacent the content view displaying the document content. A motion from top to bottom may cause the content view to shrink the document space displayed and show fore edge view 204' controls in order to riffle through pages from top to bottom. Likewise, other edges or locations adjacent to the content view are adaptable for displaying the fore edge view depending upon the motion direction and/or type of motion input retrieved at the touch screen surface of the display.

On multi-touch displays, such as illustrated in FIG. 2, the fore edge view may be displayed as long as the finger or thumb used to perform the gesture is held on the touch screen. On single-touch display screens, the fore edge view 204' may be displayed until the user taps the screen in the content area (i.e., outside of the fore edge view), or until some other hide fore edge view input is received, which may include a swipe, gesture, motion, click, or like input signal to hide the fore edge view 204' being displayed.

Figure 5:
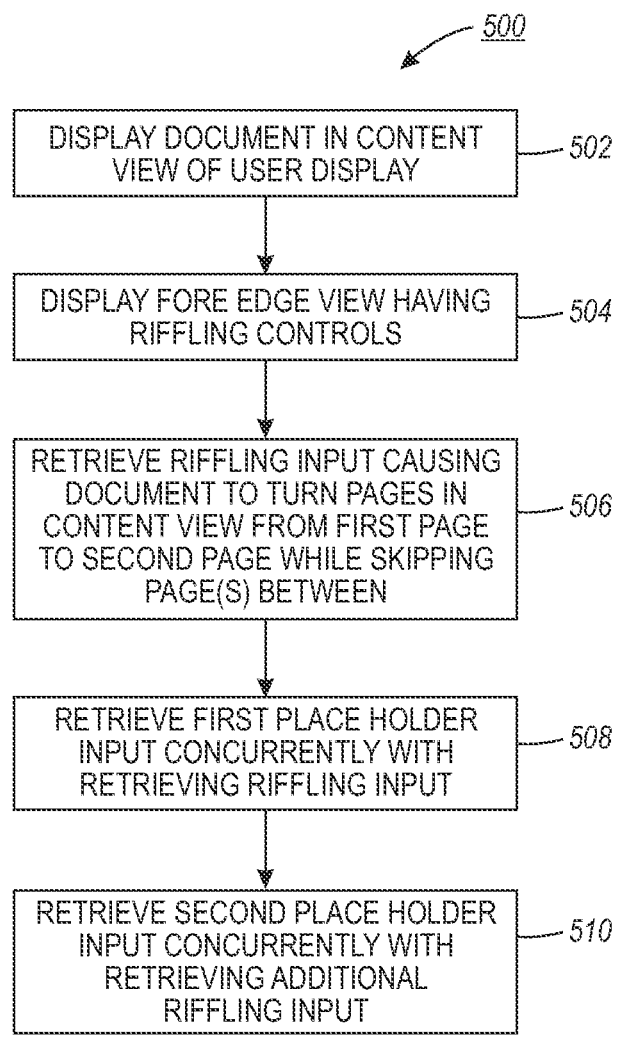
FIG. 5 is a flowchart detailing an exemplary method for riffling pages of a document.

An example methodology 500 for implementing a user interface system for enabling riffling through an electronic document is illustrated in FIG. 5. While the method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 500 initiates to retrieve a document 212' for reading and/or viewing by a reader to control riffling actions, and is discussed below with reference to FIGS. 1 thru 4 above. At 502, the document is displayed by an electronic device 200, 200' (e.g., an e-reader or the like). A content view 202' of the user display presents the document to the reader.

At 504, a fore edge view 204' is displayed that provides controls for riffling through the pages of the document. The fore edge view 202', for example, has markers 214', page edges 210 and the like for interfacing with the reader and the device. The fore edge view 204' is displayed upon receiving a fore edge view input for the fore edge of the document to be generated. In one embodiment, the fore edge view may be permanently displayed on the same display or a separate display of the device.

Displaying the fore edge view includes re-sizing or narrowing the content view with the document therein to provide the fore edge view with controls displayed at an adjacent location with respect to the document. The fore edge view can be displayed from any adjacent location. The display is therefore similar to a book or bounded document having pages and a fore edge section opposite the bounded spine. The fore edge view request/input is retrieved by the device via at least one of a motion, a tilt performed by the device, a swipe, click, tap, and hardware button or control input, gesture and the like.

The fore edge view 204' enables riffling to other pages in the document back and forth based on the speed, location or frequency in which the view is provided input, such as by a swipe, gesture or other such input, including a motion of the device. A motion of the device may include a tilt, shake or other such motion to provide a fore edge view input for displaying the fore edge view and to simulate the effects of gravity on a physical book, as when the book is held upright by the spin and pages fall down.

The fore edge view also displays page edges 210' and markers 214' that correspond to sections of the document being displayed in the content view 202'. Each marker 214' may correspond to a section within the document for the reader to flip to quickly. Riffling controls include various inputs retrieved at the fore edge view that allows a user to riffle through pages of the document from a first page displayed in the content view to a second page while skipping over at least one page in between the first and the second page.

At 506, a riffling input is retrieved by the device that causes the document 212' to turn pages in the content view 202' from a first page to a second a page while skipping at least one page there between. A page of the document includes text and/or graphic images for reading or presenting to the user, and may also include blank pages therein with no text or graphic as well. Further, the pages may include web pages or representations of pages that may not typically be in a bound format for physical reading, but could be electronically to supply a feel for flipping through or riffling through as an alternative to just open websites or tabs that are often presented during a surfing experience having multiple web pages opened, for example. Any number of implementations for riffling electronically through electronic information is envisioned.

In one embodiment, a hide fore edge view input may be retrieved by the device causing only the content view 202' to be displayed, for the fore edge view to be minimized to a different location, or only displayed as an icon, for example. The input for hiding the fore edge view or returning it to full view of the content view in the display can be an opposite swipe or motion detected for presenting the fore edge view 204' or another any other input to the device that corresponds accordingly.

At 508, a first place holder input is retrieved by the device that enables a page to be held, such as with a book mark, finger or other mechanism used to physically hold a place in a book or other document. For example, a tap on the content view 202' while the fore edge view 204' is presented could indicate that a first place is to be held while a riffling action is performed concurrently on a section of the page edges in the fore edge view 204'.

At 510, a second place holder is retrieved by the device for holding a second different section or page of the document. Any number of place holder inputs may be performed to allow the place of the electronic document in the content view displayed to be held and later recalled. Riffling may occur at the same time, before, or after the place holder is received and the document may riffle backwards and forwards through the pages. Any direction for riffling is also envisioned.

In another embodiment, riffling may occur at different locations of the document in the content display. For example, a section of the content view in the display may be tapped to trigger the fore edge view that is not seen initially. Riffling occurs on a touch screen interface, for example, and the number of pages skipped and/or speed of riffling may be determined based on the depth, speed, and/or frequency in which a motion is detected. For example, a reader may swipe the right side of a page quickly and/or in a longer distance to cause riffling closer to the end of the document, or slower and over less distance to skip only a few pages, such as for riffling around the beginning of the document.

The method illustrated in FIG. 5 may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 5, can be used to implement the method for editing images in a document.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for a user interface system to enable riffling through pages in a user display of an electronic device executed via a processor with a memory storing executable instructions having the method, comprising:
   displaying a document in a content view of the user display by the processor;
   displaying a fore edge view of the document in the user display in response to a direction of motion associated with a user fore edge view request, the fore edge view allowing the user to riffle through the pages; and
   retrieving a riffling input that causes the document to turn the pages of the document in the content view of the user display from a first page to a second page and skip at least one page in between the first page and the second page, wherein the riffling input comprises user touch or motion of variable movements on the content view in the user display comprising depth, speed and frequency, and the retrieving includes detecting the variable movements for selectively varying a number of pages skipped or speed of the riffling.

2. The method of claim 1, wherein displaying the fore edge view comprises:
   resizing the content view in the user display; and
   displaying the fore edge view adjacent the content view.

3. The method of claim 2, wherein the content view displays text and/or graphic electronic images and the fore edge view displays page edges corresponding to the pages in the document and markers that designate various sections within the document and that open the document to a respective section or page of the document upon receiving a touch or motion input.

4. The method of claim 2, wherein the displaying the fore edge view adjacent the content view further comprises positioning the fore edge view in accordance with the direction associated with the fore edge view request.

5. The method of claim 1, wherein the fore edge view request is received via a motion of the electronic reading device.

6. The method of claim 1, wherein the riffling input is received at the fore edge view of the user display via the user touch or motion thereat that causes the document to turn pages from the first page to the second page, and the fore edge view request is received at the content view of the user display by a touch or motion thereat or from a motion of the electronic device.

7. The method claim 1, comprising:
   riffling through the pages from the first page to the second page for display in the content view, while concurrently receiving a place holder input to hold a location of the first page at the content view.

8. The method of claim 7, further comprising:
flipping back to the first page without displaying any other pages of the document, upon receiving a return place holder input, wherein the place holder input is received by a touch provided at the content view of the user display and the return place holder input is received via release of the touch.

9. The method of claim 1, wherein the document includes any document with multiple pages including a plurality of opened windows having websites, webpages, any data in the opened windows or representation of any opened window in the content view of the user display.

10. The method of claim 1, comprising:
receiving a hide fore edge input that causes the fore edge view to hide from view and only the content view to be displayed in the user display.

11. A method for a user interface system to enable riffling through pages in a user display of an electronic device executed via a processor with a memory storing executable instructions having the method, comprising:
retrieving a document having multiple pages by the processor;
displaying the document in a content view of the user display by the device;
upon receiving one of a plurality of fore edge view requests, determining a direction of motion associated with the one of the plurality of fore edge view requests and displaying a fore edge view of the document in the user display corresponding to the determined direction that provides riffling controls to riffle through pages; and
retrieving a first riffling input that causes the document to turn the pages of the document in the content view of the user display from a first page to a second page and skip a first number of pages in between the first page and the second page;
retrieving a second riffling input while holding the location of the first page and holding a location of the second page in response to a second place holder input retrieved and turning pages of the document from the second page to a third page while skipping a second number of pages in between the second page and the third page, wherein the riffling input comprises user touch or motion of variable movements on the content view in the user display comprising depth, speed and frequency, and the retrieving includes detecting the variable movements for selectively varying a number of pages skipped or speed of the riffling.

12. The method of claim 11, wherein the riffling input is received at the fore edge view of the user display via a touch or motion thereat that causes the document to turn pages from the first page to the second page, and the fore edge view request is received at the content view of the user display by a touch or motion thereat or from a motion of the electronic device.

13. The method of claim 11, further comprising:
flipping back to the first page or the second page without displaying any other pages of the document, upon receiving the first or second return place holder input, wherein the first or second place holder input is received by a touch provided at the user display and the return place holder input is received via release of the touch.

14. The method of claim 11, comprising:
upon receiving a first fore edge view input, displaying the fore edge view at a bottom of the content view;
upon receiving a second fore edge view input, displaying the fore edge view at a left side of the content view;
upon receiving a third fore edge view input, displaying the fore edge view at a right side of the content view;
upon receiving a fourth fore edge view input, displaying the fore edge view at a top side of the content view;
wherein after at least one of the fore edge view inputs are received, receiving any one of the riffling inputs causes the pages to turn opposite a location of the fore edge view.

15. The method of claim 14, wherein the fore edge view is displayed at a location adjacent to the content view and the location where the fore edge view is displayed is based upon where the swipe gesture is received or based upon a direction of motion of the electronic device.

16. The method of claim 11, wherein the content view displays text or graphic electronic images and the fore edge view displays edges of a number of pages in the document having markers for various sections within the document that each opens the document to a respective section of the document upon receiving a touch or motion input thereat.

17. The method of claim 11, wherein the fore edge view is displayed in response to a gesture or a tap at the content view of the user display or in response to a motion of the electronic device that each cause the content view to become smaller and the fore edge view to displayed.

18. The method of claim 11, wherein the first number of pages and the second number of pages comprises one or more pages of the document depending upon a location of the first riffling input and a location of the second riffling input respectively.

19. An electronic device having a user display for displaying an electronic document having pages, comprising:
a communication port for receiving the electronic document;
a motion sensor that senses a motion of the device;
a touch screen interface in the user display that senses at least one of a tap, swipe and motion as an input on the user display;
a content view generator that displays the document in the user display;
a fore edge generator that displays a fore edge view in response to a direction of motion associated with the input received by the touch screen interface or the motion sensed by the motion sensor, the fore edge view having page edges corresponding to pages of the document and riffling controls thereat and positioned in accordance with the associated direction;
wherein the riffling controls include a receptor configured to cause pages of the document to skip one or more pages to a different page for display in the user display, and a place holder configured to hold a location of one or more pages to return to without having any other page displayed in the user display, wherein the riffling input comprises user touch or motion of variable movements on the content view of the user display comprising depth, speed and frequency, and the retrieving includes detecting the variable movements for selectively varying a number of pages skipped or speed of the riffling, and wherein the document is resized in the content view upon display of the fore edge view.

20. The device of claim 19, wherein the electronic device is an electronic mobile reader device configured to receive the document wired and wirelessly.

* * * * *